US 6,704,516 B1

(12) United States Patent
Dorsey et al.

(10) Patent No.: US 6,704,516 B1
(45) Date of Patent: Mar. 9, 2004

(54) METHOD OF AND APPARATUS FOR OPTIMIZING A MINIMUM TURN AROUND TIME DURING AN INFRARED DATA COMMUNICATION

(75) Inventors: Donald Arthur Dorsey, Vernon Hills, IL (US); Charles Philipp Binzel, Bristol, WI (US); Nicholas Francis Jungels, Lake Geneva, WI (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/504,524

(22) Filed: Feb. 15, 2000

(51) Int. Cl.[7] .................................................. H04B 9/00
(52) U.S. Cl. ...................... 398/138; 398/130; 398/136; 398/147; 455/423; 455/425
(58) Field of Search ................................. 709/228, 234, 709/220; 379/93.31, 93.33; 370/276, 277, 282, 395.62, 233, 235, 468, 465

(56) References Cited

U.S. PATENT DOCUMENTS

| 4,168,427 A | * | 9/1979 | Hubbard ..................... 398/138 |
| 4,777,662 A | * | 10/1988 | Nakata ........................ 359/153 |
| 4,850,042 A | * | 7/1989 | Petronio et al. ............. 398/176 |
| 5,042,029 A | * | 8/1991 | Hayakawa ................... 370/231 |
| 5,495,357 A | * | 2/1996 | Osterhout .................... 398/107 |
| 5,914,796 A | * | 6/1999 | Selin ........................... 398/118 |
| 6,161,009 A | * | 12/2000 | Skurdal et al. ............. 455/423 |

FOREIGN PATENT DOCUMENTS

| GB | 2328817 A | 3/1999 |
| WO | WO 90/03072 A1 | 3/1990 |

* cited by examiner

Primary Examiner—Leslie Pascal
Assistant Examiner—David Payne
(74) Attorney, Agent, or Firm—Paul J. Bartusiak; Lawrence J. Chapa

(57) ABSTRACT

A method of and apparatus for optimizing a minimum turn around time (MTAT) between (a) a reception by a first device of a first infrared data communication (IRDC) frame sent from a second device and (b) a transmission by the first device of a second IRDC frame to the second device. The MTAT value received from the second device is loaded into a storage device. The first IRDC frame from the second device is received, and a counter of the first device either resets upon reception of each of the plurality of characters of the first IRDC frame or increments when none of the plurality of characters are received. The first device transmits the second IRDC frame to the second device when the counter value reaches the MTAT value.

23 Claims, 5 Drawing Sheets

— PRIOR ART —

— PRIOR ART —

FIG. 3 — PRIOR ART —

METHOD OF AND APPARATUS FOR OPTIMIZING A MINIMUM TURN AROUND TIME DURING AN INFRARED DATA COMMUNICATION

FIELD OF THE INVENTION

The present invention relates generally to infrared data communication (IRDC), and more particularly to, a method and apparatus for optimizing a minimum turn around time (MTAT) between the reception and the transmission, as well as between the transmission and the reception, of IRDC data by an infrared device.

BACKGROUND OF THE INVENTION

Infrared data communication (IRDC) between two infrared (IR) devices is constrained by the half duplex nature of IRDC and certain industry standards, both of which affect the quality and speed of the IRDC. The half duplex nature of IRDC limits the IRDC because only one infrared device can transmit infrared data at a time to the other infrared device, rather than having a simultaneous exchange of such infrared data. Accordingly, speed (throughput) is sacrificed. Moreover, this limitation is further complicated by a Minimum Turn Around Time (MTAT) set forth by industry protocol. Both of these limitations may effect the quality (lost data) or speed (throughput) of the data transmission and their effect must therefore be minimized. Both of these limitations are explained by reference to prior art FIGS. 1, 2, and 3.

FIG. 1 is a prior art block diagram view of an IRDC between two infrared devices. In FIG. 1, a first IR device 5 is in communication with a second IR device 10 using IRDC as the communication means. The first IR device 5 transmits data through frame(s) 15 to the second IR device 10, and in response, the second IR device 10 responds to the first IR device 5 with an acknowledgement frame 20.

The half duplex nature of the IRDC is exemplified in FIG. 2 by an exploded view portion 25 of the first IR device 5 of FIG. 1. In the exploded view portion 25, a first transition (T1) 30 and a second transition (T2) 35 are shown. In T1 30, the first IR device 5 (FIG. 1) is first receiving 40 (FIG. 2) a frame from the second IR device 10 (FIG. 1) and then transmitting 45 (FIG. 2) an acknowledgement frame to the second IR device 10 (FIG. 1).

Likewise, in T2 35 (FIG. 2), the first IR device 5 (FIG. 1) is first transmitting 55 (FIG. 2) a frame to the second IR device 10 and then receiving 60 (FIG. 2) an acknowledgement frame. At either transition T1 or T2, the first IR device 5 is able only to perform one transmission with the second IR device 10 at a time (i.e. can only perform at half duplex). Simultaneous transmission by both devices is not possible. Thus, throughput suffers since the IRDC is essentially a timed one-way communication.

This limitation is further complicated by the fact that a MTAT standard must be adhered to during the IRDC between the first 5 and second 10 IR devices (FIG. 1).

MTAT is associated with the minimum time needed between the first reception 40 (FIG. 2) of a frame to the transmission 45 (FIG. 2) of an acknowledgement frame and is depicted by the dashed box 50 for T1 30 and dashed box 65 for T2 35 (FIG. 2).

In essence, the first IR device 5 (FIG. 1) must wait the MTAT 50 (FIG. 2) after having received the last byte of a frame from the second IR device 10 (FIG. 1) before the transmission 45 (FIG. 2) of the acknowledgement frame. In the Infrared Data Association publication titled "Serial Infrared Link Access Protocol" (IrLAP), version 1.1, dated Jun. 16, 1996 (hereby incorporated by reference), Section 6.6.8 provides the MTAT parameter value to be from 0 to 10 microseconds. This MTAT is generally specified by the receiving device, i.e. the second IR device 10 (FIG. 1).

Thus, the exact time from first reception 40 to first transmission 45 (FIG. 2) which the first IR device 5 (FIG. 1) must implement must be at least that which was specified by the second IR device 10 during the transmission. If this parameter is not followed, and the first IR device 5 does not wait at least the MTAT, there is a risk that the second IR device 10 will not receive the frame 15 properly (e.g. lose data). Furthermore, if the first IR device 5 waits significantly longer than the MTAT 50 (FIG. 2), then throughput can be seriously reduced due to the extra delay time during which no data is being transmitted by either device. There is therefore a need to optimize the actual MTAT to match the standard MTAT prescribed.

A similar problem exists at T2 35 (FIG. 2). At T2, the first IR device 5 (FIG. 1) first transmits 55 (FIG. 2) the frame to the second IR device 10 (FIG. 1) and then receives 60 (FIG. 2) an acknowledgement frame from the second IR device 10 (FIG. 1). The MTAT associated with this transition is symbolized by box 65 (FIG. 2).

The problems associated with the T2 is that after transmitting 55 the last byte of a frame, the first IR device 5 is allowed a time interval equal to the MTAT to get ready to receive the acknowledgement frame 20 from the second IR device 10. Thus, the second IR device 10 is not allowed to begin its transmission until this MTAT interval has elapsed. Again, the MTAT parameter is set forth in IrLAP with values ranging from 0 to 10 microseconds. The MTAT for T2 must in all cases be no greater than that which was specified by the second IR device 10 during the set up or link between the first IR device 5 and the second IR device 10. Furthermore, minimizing the value of the MTAT 65 is an important design goal because the longer the second IR device 10 is forced to wait before starting its transmission, the more the throughput will be reduced due to the extra delay time during which no data is being transmitted by either device.

Although the key is to optimize the actual MTAT to match the industry parameter, this remains a problem that has not been addressed by conventional IRDC receivers/transmitters and related components. A conventional receiver/transmitter used in IRDC is illustrated in prior art FIG. 3.

FIG. 3 is a block diagram view of a conventional receiver/transmitter of an IR device used in an IRDC. In prior art FIG. 3, the first IR device 5 contains a central processing unit (CPU) 70, conventional components 75 and a receiver/transmitter 80. The CPU 70 is used to control the exchange of data among the components of the first IR device 5. The conventional components 75 are standard control logic and buses used in an IRDC by an IR device, such as those components shown in FIG. 9.0 of the publication (datasheet) "PC16550D Universal Asynchronous Receiver/Transmitter With FIFOs" (UART) dated June 1995, hereby incorporated by reference. The UART is manufactured by National Semiconductor Corporation. The receiver/transmitter 80 corresponds to the PC16550D part of the UART and includes the conventional components 85 depicted in FIG. 5.0 of the UART publication. The conventional components 85 thus include the general registers, control logic, latches, buses and buffers as shown in FIG. 5.0 of the UART publication.

Specifically separated from the conventional components 85 in FIG. 3 are the receiver FIFO trigger interrupt 90, receiver FIFO 95 and IDLE interrupt 100, all of which communicate with one another using buses or similar connection lines in the receiver/transmitter 80. The receiver FIFO 95 is used to store the characters from a frame received from another IR device. The receiver FIFO trigger interrupt 90 and the IDLE interrupt 100 are methods used by the UART to inform the CPU 70 that characters from a frame are present in the receiver FIFO 95. In essence, these two methods are used to estimate the proper time to send the characters in the receiver FIFO 95 to acknowledge receipt of the received frame, irrespective of the MTAT. These two methods used by conventional UARTs create serious limitations in optimizing the MTAT of the IRDC.

A first method uses the receiver FIFO trigger interrupt 90 which notifies the CPU 70 when a certain number of characters are present in the receiver FIFO 95. Usually, this number of characters can be specified by the CPU 70 by loading a UART register (not shown) with the particular number of characters.

A second method of informing the CPU 70 that characters are present in the receiver FIFO 95 is by using the IDLE interrupt 100 (also referred to as a FIFO "time out" interrupt) which occurs if at least one character is present in the receiver FIFO 95 and a certain amount of time has elapsed (called the "IDLE time out") during which no character reception has occurred. In some UARTS, the IDLE time out can be specified by the CPU 70 by loading a UART register (not shown).

In general, these two methods inaccurately estimate the appropriate MTAT for transmission of characters received in the receiver FIFO 95 and therefore either send the acknowledgement frame too early (losing data) or too late (losing throughput). Specifically, these two methods affect two broad categories of IRDC, including (1) the MTAT associated with the transition between first receiving a frame to then transmitting an acknowledgement frame (T1 of FIG. 1); and (2) the MTAT associated with the transition between first transmitting a frame to then receiving an acknowledgement frame from another IR device (T2 of FIG. 2).

The problems associated with the MTAT from reception to transmission are mainly due to the manner in which the UART implements the MTAT. Inaccuracies result for three reasons.

First, there is an error due to the UART interrupt latency. That is, when a UART receiver interrupt occurs (either through the receiver FIFO trigger interrupt 90 or the IDLE interrupt 100) there may be some latency before the CPU 70 has a chance to service the interrupt and record the time at which the received characters were read from the receiver FIFO 95. This latency is typically due to other high priority interrupts that may be in the process of being serviced when the UART interrupt occurs. Thus, due to this latency, the actual MTAT from receiving the transmission to transmitting the acknowledgement frame may be greater than what is really necessary because the timer used to time the interval required was started "late." Thus, throughput is sacrificed.

Second, there is an error due to the IDLE time out described above. Recall that the IDLE time out is an amount of time elapsed during which no characters have been received by the receiver FIFO. When the IDLE time out has occurred, the IDLE interrupt informs the CPU 70 that at least one character has been received and that a certain amount of time has elapsed during which no characters have been received. However, the IDLE time out must be accounted for in determining if the prescribed MTAT has elapsed. In the past, the IDLE time out has been subtracted off from the time that the CPU 70 waits after reading the characters out of the receiver FIFO 95 and before starting the transmission of the acknowledgement frame 45 (FIG. 2). The problem with this alternative is that another character might have been received by the UART between the time the IDLE interrupt was triggered and the time the CPU read the characters out of the receiver FIFO 95. Thus, if this alternative is chosen, the MTAT implemented will sometimes be too short by the value of the IDLE time out.

Another alternative is to wait the full MTAT specified by the other IR device after reading the characters out of the receiver FIFO 95 and before starting transmission of the acknowledgement frame 45 (FIG. 2). The problem with this alternative is that the MTAT implemented will in most instances be greater than necessary by the value of the idle time out, and throughput will be sacrificed.

A third error that generally occurs when the UART implements the MTAT from reception to transmission is that errors occur due to the preemption of certain software tasks that implement delays. This error would only be incurred if the CPU 70 has no timer at its disposal which it can program to generate an interrupt at the exact time when the required MTAT has lapsed so that transmission of the acknowledgement frame may be started. If this is the case, then a software routine must implement a hard loop waiting for the MTAT to elapse. However, if that software routine runs from a task which can be preempted by other high priority tasks or interrupts, then that software routine may sometimes be prevented from starting the IRDC at exactly the right time. Thus, the MTAT which is implemented will be greater than necessary.

There further exists certain problems associated with the MTAT between (1) a transmission of a frame to an IR device and (2) the reception from that device of an acknowledgement frame. These problems stem from the fact that the MTAT from transmission to reception cannot be set to a minimum value of zero. The reason for this is that the IR device's receiver and transmitter are virtually always in close enough proximity to each other such that any data transmitted by the transmitter is automatically received by the receiver. If the UART's receiver is left enabled while the transmission is in progress, then the data which is transmitted will be "looped back" and will appear in the UART's receiver FIFO 95 (FIG. 3).

Thus, if an IR device employs a standard UART as the receiver/transmitter, the fastest MTAT from transmission to reception that it can possibly implement is accomplished by having the CPU enable the UART's interrupt when it loads the final data comprised in the transmission frame into a transmission FIFO, and then when the UART interrupt occurs (which indicates that transmission of the last character has now completed) perform the following interrupt service routine which handles the transmit complete condition.

First, if the UART's receiver was disabled during the transmission (to avoid receiving the loop back data), then re-enable the UART's receiver. Second, if the UART's receiver was left enabled during the transmission (and thus the loop back data was received), then flush the UART's receiver FIFO of the loop back data that is present to avoid misinterpreting the loop back data as data received from the other IR device. When this procedure is performed, it is obvious that the MTAT from transmission to reception cannot be set to zero because the following delay times need to be accounted for. A first delay time must account for the UART interrupt latency since there may be some latency before the CPU 70 has a chance to service the interrupt.

Second, the time to service the interrupt must also be accounted for by the MTAT. These two latency times therefore must be accounted for in the MTAT and the MTAT can therefore not be set to a zero value, in order to be optimized.

A need therefore exists for a method and apparatus that optimizes the MTAT (1) when making the transition from receiving an IRDC frame to transmitting an acknowledgment IRDC frame, and (2) when making the transition from transmitting an IRDC frame to receiving an acknowledgement IRDC frame that overcomes the limitations described above.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein:

FIG. 7 is a flow chart of a still further embodiment of the method of the present invention.

DETAILED DESCRIPTION OF THE PREFERRED EMBODIMENTS

Figure 4:
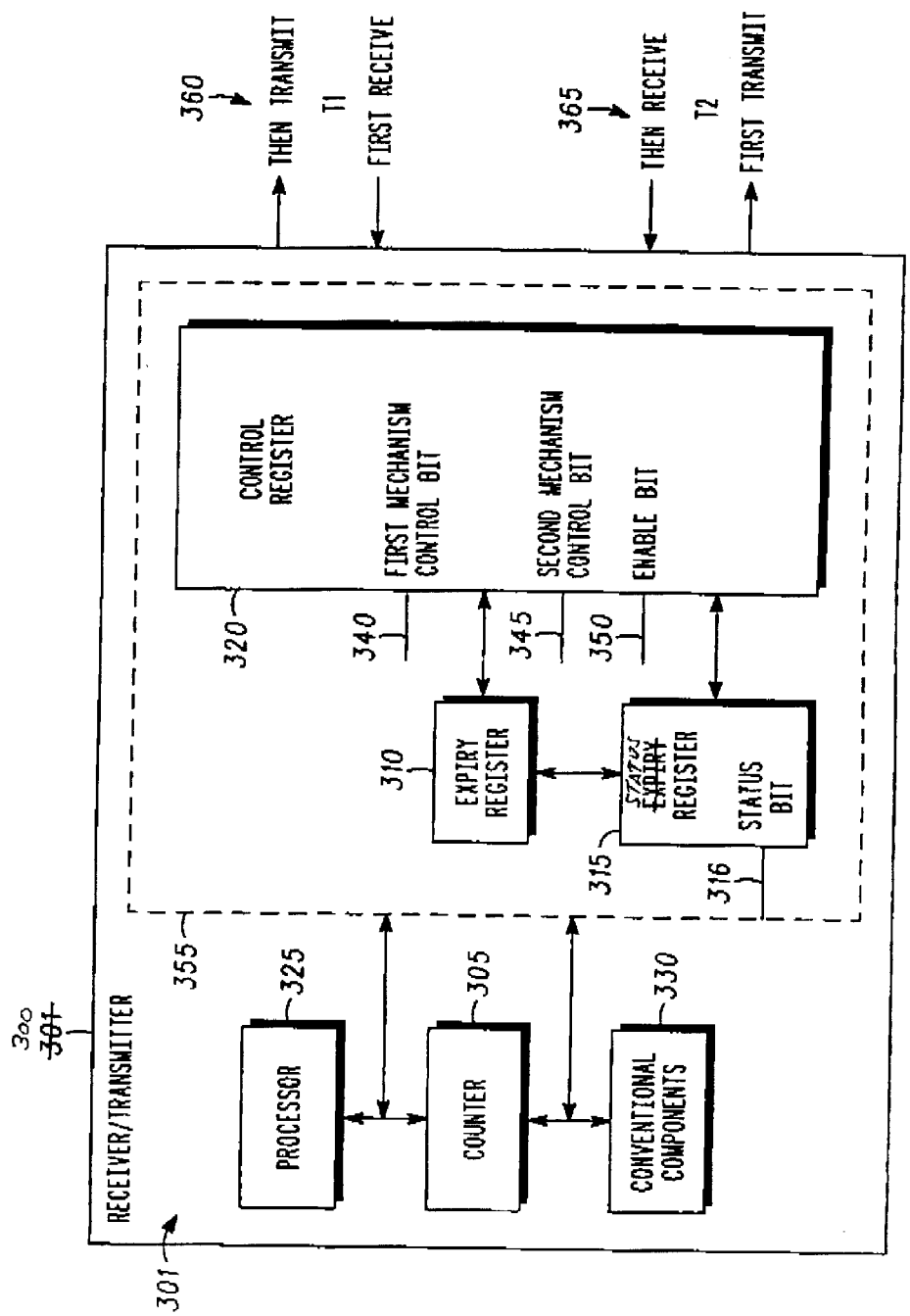
FIG. 4 is a block diagram view of an embodiment of the apparatus of the present invention.

FIG. 4 is a block diagram view of an embodiment of the apparatus of the present invention. In FIG. 4, a receiver/transmitter 300, which is an embodiment of the apparatus of the present invention, is shown containing the components to receive and transmit IRDC frames to other IR devices. The receiver/transmitter 300 may therefore, in one embodiment, be part of a first device 301 that transmits or receives infrared data to and from a second device (not shown). Alternatively, in a further embodiment, the receiver/transmitter 300 may be a part of a second device (not shown) that transmits or receives infrared data to and from a first device 301.

Since infrared data is being communicated, the IrLAP, as described in the publication described above, is used for the data transmission as is well known in the industry. The receiver/transmitter 300 may be, in another embodiment, an improved UART, as the UART is described in the UART publication; however, unlike the UART, the receiver/transmitter 300 of FIG. 4 contains a counter 305, specific bits including the status bit 316, the first mechanism control bit 340, the second mechanism control bit 345, the enable bit 350, as well as the control register 320, the status register 315, and the expiry register 310. Those three registers are found in the storage device 355.

While the specific bits are located in the registers of FIG. 4, the bits may alternatively be located in any storage device. Those components added to the conventional UART produce a unique apparatus that are implemented in embodiments of the method of the present invention to optimize the MTAT that was not available with the conventional UART.

Returning to FIG. 4, the receiver/transmitter 300, has a counter 305, a processor 325, conventional components 330 and a storage device 355. Within the storage device 355 is an expiry register 310, a status register 315 and a control register 320. All these components are in communication using well-known techniques for transmitting data among such components, such as buses, conducting materials and the like to transmit electrical data or signals among the components. The counter 305 is a conventional counter that increments over time to indicate a number or amount of time passed. The expiry register 310, the status register 315, and the control register 320 are all conventional registers that store data before it is processed by, for example, the processor 325.

The status bit 316, the first mechanism control bit 340, the second mechanism control bit 345, and the enable bit 350 are unique used bits of data information that may be set (e.g to a high value of 1) or unset (e.g. to a low value of 0). Whether setting provides a high or low value is not as important as ensuring that setting these bits is the opposite of unsetting the bits. Bits may be set or unset by the processor 325 as is well known in the art.

Figure 1:
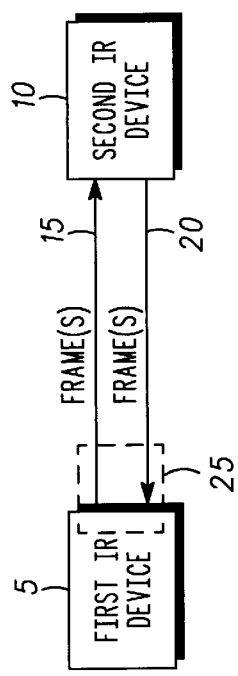
FIG. 1 is a prior art block diagram view of an IRDC between a first IR device and a second IR device.
Figure 2:
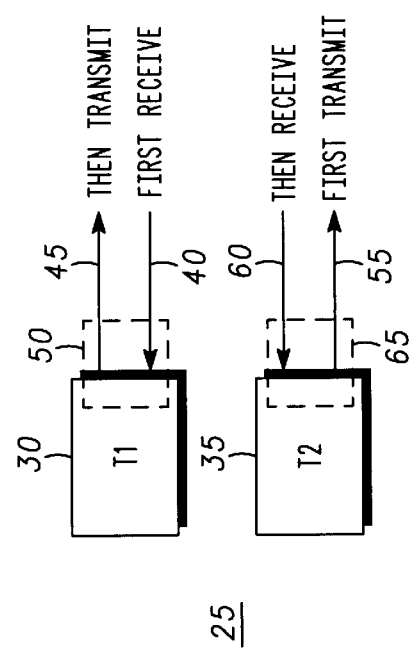
FIG. 2 is an exploded view of a portion of the first IR device of FIG. 1.
Figure 3:
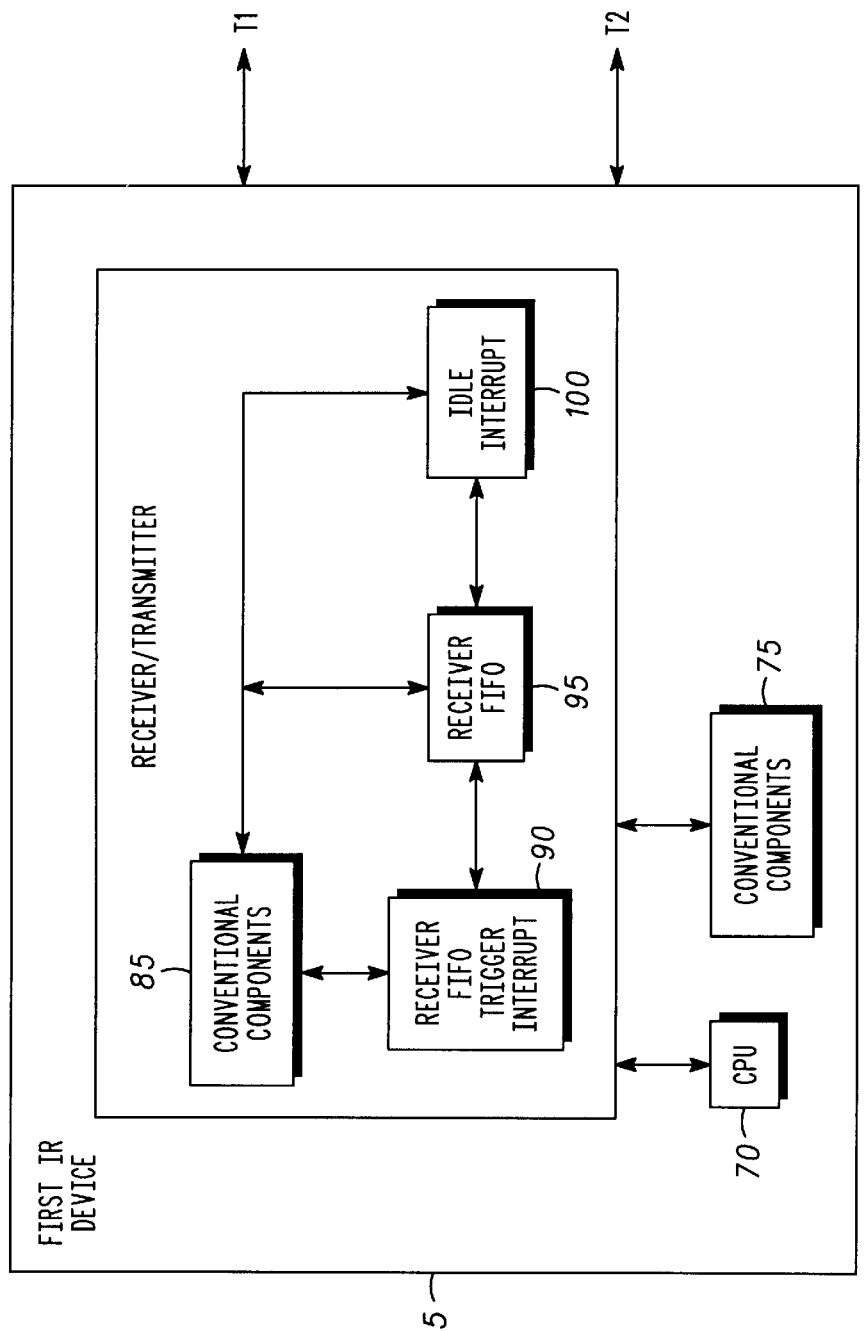
FIG. 3 is a block diagram view of the components of a prior art IR device.

Shown in FIG. 4 are the processor 325 and conventional components 330. The processor 325 is a conventional microprocessor or plurality of microprocessors that control the flow of data or information in the receiver/transmitter 300 and between the receiver/transmitter 300 and related devices. The conventional components 330 are components, such as those components of the PC16550D UART, that are not listed as separately shown in the receiver/transmitter 300. While FIG. 3 shows a separate expiry register 310, status register 315, and control register 320, these registers may all be combined into one register that contains the bits or performs the function of those bits as claimed below.

The receiver/transmitter 300 of FIG. 4 has different uses depending upon which of the two types of transitions are being performed. However, the common use of the receiver/transmitter 300 is to optimize the MTAT by effectively matching a desired MTAT or MTAT value to an actual MTAT or counter value, as will be explained in detail below. By doing this, the MTAT is optimized so that the MTAT is not too short (where data is lost) or not too long (where throughput is sacrificed).

In general, the receiver/transmitter 300 of FIG. 4 performs two types of transitions, T1 360 and T2 365. T1 360 requires the receiver/transmitter 300 to first receive a first IRDC frame from a second device (not shown) and then transmit a second IRDC frame (acknowledgement frame) to the second device. T2 365, on the other hand, requires the receiver/transmitter 300 to first transmit a first IRDC frame to the second device and then receive a second IRDC frame (acknowledgment frame) from the second device. Under both types of transitions, a MTAT must be optimized to ensure that data is not lost and throughput is maximized.

Optimizing MTAT for Reception to Transmission (T1)

The use of the receiver/transmitter 300 for optimizing the MTAT for T1 begins during the setup of the IRDC link between a first device 301 (FIG. 4) and a second device (not shown). That is, before an IRDC occurs between two devices, an initial setup between the two devices occurs that resembles a negotiation process between two parties.

For T1, the second device (not shown) transmits to the first device 301 the MTAT that the first device 301 should adhere to. This MTAT is stored by the first device 301 in a storage device 355, such as the expiry register 310 of FIG. 4, as an MTAT value. In essence, the MTAT value is the desired MTAT that the receiver/transmitter 300 wishes to optimize its actual MTAT to. The MTAT value is loaded in a form that is comparable to the time elapsed on the counter 305. That is, the MTAT received from the second device is most likely in microseconds, e.g. between 0–10 $\mu$s as set forth by the IrLap.

When the MTAT in microseconds is loaded in the storage device 355, the MTAT is translated by conventional means into counter "ticks" corresponding to the MTAT in microseconds using well-known conversion algorithms. Thus, the MTAT value may later be compared to a counter value of the counter 305 since both are expressed in comparable quantities. The storage device need not be actually located on the receiver/transmitter 300, and in an alternative embodiment, needs only be in communication with the receiver/transmitter 300 so that the MTAT value loaded in the storage device may be accessed by the receiver/transmitter 300.

After the MTAT value is loaded into the storage device 355, the first device 301 begins receiving the first IRDC frame. The first IRDC frame is sent to the first device 301 from the second device as a string or plurality of characters. As these characters are received, various actions occur on the receiver/transmitter 300.

First, the characters are stored in a receiver FIFO (not shown) that is typically located with the conventional components 330. FIFO's are well-known storage devices, such as registers.

Second, as each character is received, the counter 305 is affected in several ways. The counter 305 is doing one of two procedures: (1) if no characters are being received, the counter increments over time, essentially acting as a timer by clocking the time elapsed since the last character was received in the FIFO receiver, and maintains the elapsed time since a character was received as a counter value (stored in any storage device of the receiver/transmitter 300); or (2) if any of the plurality of characters are received, the counter is reset to a reset value, for example, a zero value that removes or flushes the counter of any time clocked. At this point, the plurality of characters are being received, or if no more characters are coming, the counter is incrementing the time since the last character was received and thereby incrementing the counter value.

Third, the acknowledgement frame or second IRDC frame must be sent back to the second device after the entire first IRDC frame has been received and the MTAT has expired. This is accomplished by comparing the MTAT value stored in the storage device to the counter value and transmitting the second IRDC frame when the counter value reaches the MTAT value.

By transmitting the second IRDC frame (e.g. return transmission) when the counter value reaches the MTAT value, the second IRDC frame is sent almost exactly at the prescribed MTAT value sent from the second device to the first device 301 during the setup of the link between the two devices. The MTAT has therefore been adhered to and no additional time was wasted since the transmission of the second IRDC frame was sent exactly at the MTAT value.

The return transmission occurs when the counter value reaches the MTAT value. Alternatively, the return transmission may occur when the counter value is equal to or greater than the MTAT value. A slight delay only slightly reduces throughput (whereas too short of a MTAT can cause a loss of data). Thus, in an alternate embodiment, the counter value may be greater than the MTAT value when the transmission of the second IRDC frame occurs since only throughput, not quality, suffers.

When the transmission of the second IRDC frame occurs (when the counter value reaches the MTAT value), the status bit 316 is set, for example, to a high 1 (e.g. asserted high). The status bit 316 may be set to other values such as a low 0 as long as any unsetting of the status bit 316 undoes (is opposite to) the setting of the status bit 316. The status bit 316 is unset when each of the plurality of characters is being received by the receiver FIFO (not shown). The processor 325 would most likely be responsible for setting and unsetting the status bit 316.

As discussed above, the transmitting of the second IRDC frame occurs when the counter value reaches the MTAT value. A software routine is used to build the second IRDC frame and prepare to immediately initiate transmission to the second device (not shown) when the counter value reaches the MTAT value.

This procedure of building a second IRDC frame and initiating transmission can be accomplished using either of two mechanisms: the first mechanism control bit 340 or the second mechanism control bit 345. These bits are conventional bits much like the status bit 316 that may be set or unset by the processor 325.

The first alternative mechanism that may be used to initiate the transmission of the second IRDC frame involves the first mechanism control bit 340. The processor 325 sets the first mechanism control bit 340 when the counter value reaches the MTAT value (i.e. when the status bit 316 is set) to enable the processor 325 to load the second IRDC frame into a storage device (e.g. a transmission FIFO not shown) for transmission. The processor 325 is given an interrupt routine to perform when the status bit 316 is set which informs the processor 325 that the transmission FIFO should be loaded with the second IRDC frame.

Note that if the required time is already elapsed at this point, the interrupt will occur immediately. If the required time has not yet elapsed, then the interrupt will occur as soon as it has. After the second IRDC frame has been transmitted, the first mechanism control bit 340 is unset by the processor 325 to disable the interrupt.

The second alternative mechanism that may be used to initiate the transmission of the second IRDC frame when the counter value reaches the MTAT value is to set, through the processor 325, the second mechanism control bit 345. This second mechanism control bit 345 sets the enable bit 350 which disables transmission of the second IRDC frame until the status bit 316 is set and then loads the transmission FIFO with the initial characters comprising the second IRDC frame. Even if the second IRDC frame has been loaded into the transmission FIFO, the second IRDC frame will not be transmitted to the second device until the status bit 316 is set thereby informing the enable bit 350 to enable transmission.

Note that if the counter value has already surpassed the MTAT value at this point, the transmission will begin immediately. However, if the required time is not yet elapsed, then the transmission will begin as soon as it has.

Optimizing MTAT for Transmission to Reception
(T2)

The use of the receiver/transmitter 300 of FIG. 4 to optimize the MTAT in T2 between (a) transmission of a first IRDC frame to a second device and (b) reception of a second IRDC frame from the second device requires only that the enable bit 350 be set. In conventional UARTs, there is no mechanism for disabling the UART's receiver while still allowing the UART to transmit. Also, even if the UART provides a general mechanism to achieve this, the receiver is not automatically re-enabled when the transmission finishes.

Unlike the UART, the receiver/transmitter 300 is capable, through the enable bit 350, of properly disabling and re-enabling the receiver, such as a receiver FIFO. The advantage of this enable bit 350 is that the enable bit 350 disables the receiver FIFO during transmission of the second IRDC frame and automatically re-enables that receiver after transmission is complete, all without any special action by the processor 325. This solves the problem in the past of not being able to set a zero value as the MTAT value due to the "loop back" problem discussed in the background.

In summary, that problem stems from the close proximity of the receiver and transmitter in the prior art UART. If the receiver is left enabled, the frames transmitted from the first device to the second device may end up in the receiver and delays are associated with either flushing that receiver out or disabling and then re-enabling the receiver.

With the enable bit 350, that is found in the storage device 355 of the receiver/transmitter 300, the "loop back" problem is solved without further action by the processor 325 since the enable bit 350 is set to disable the receiver when the transmission begins and then automatically re-enable the receiver after the transmission of the second IRDC frame is completed. Now the MTAT value for the transmission to reception may be set to a zero value since no delays associated with flushing the receiver FIFO or calling interrupts (which involves the delaying processor 325) to disable and then re-enable the receiver are needed.

Figure 5:
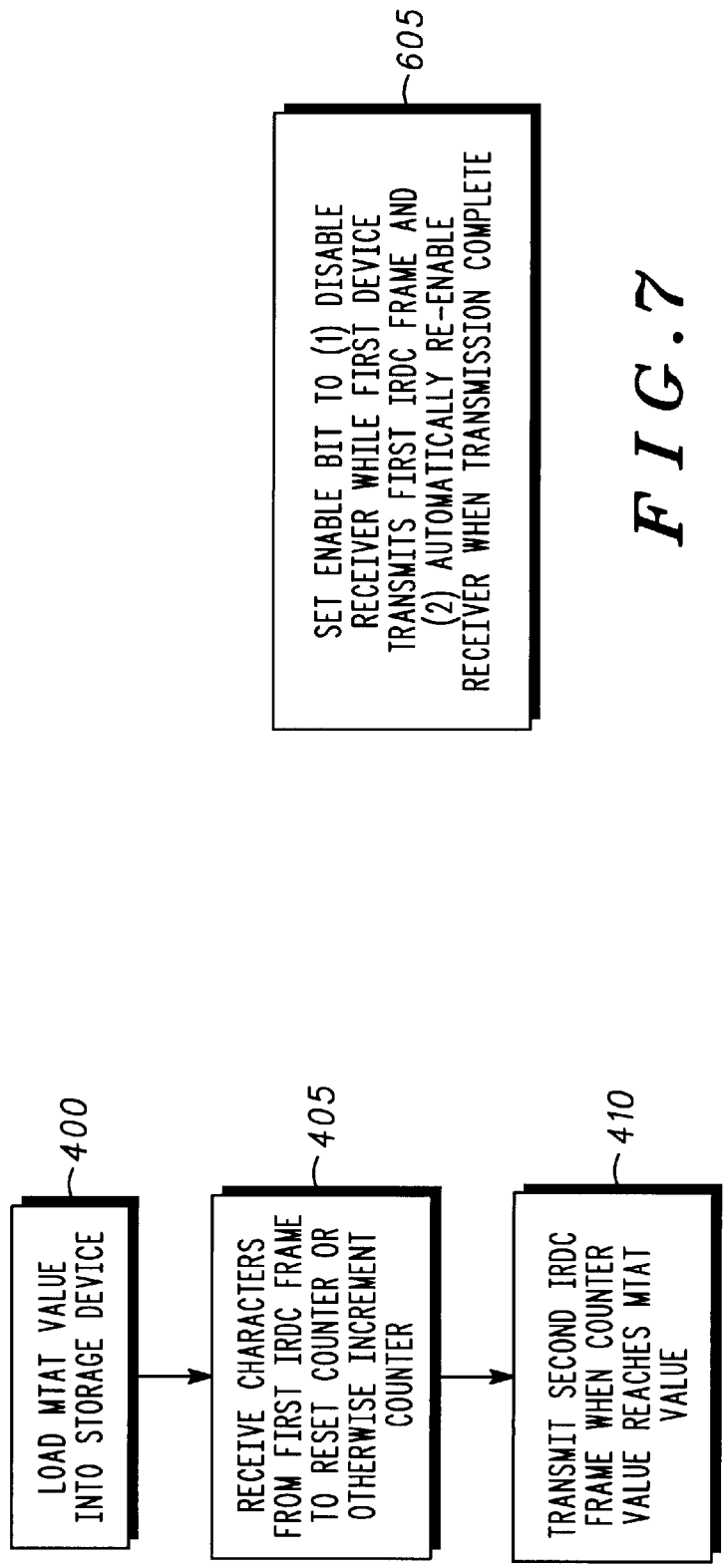
FIG. 5 is a flow chart of an embodiment of the method of the present invention.

FIG. 5 is a block diagram view of an embodiment of a method of optimizing an MTAT. In FIG. 5, a three step method is shown for an embodiment of the method of optimizing the MTAT of the T1 transition, i.e. the time between (a) the reception of the first IRDC frame and (b) the transmission of the second IRDC frame.

This embodiment optimizes the MTAT specified by a second device to a first device by matching the MTAT value dictated by the first device with a counter value of the actual MTAT value that has elapsed at the first device. The MTAT is therefore optimized because no more and no less time than the MTAT is spent and thereby optimizing both speed (throughput) and quality (no lost data).

In this embodiment, the method begins at step 400 by loading an MTAT value received from a second device into a storage device, for example, an expiry register, that is in communication with a first device. The step 400 is typically performed during the setup of the link between the first and second devices.

In a further embodiment, that MTAT value is translated into a counter value when it is loaded into the storage device. Thus, while the MTAT value may be in microseconds (e.g., zero to ten microseconds per the IrLAP), that MTAT value is translated into ticks of a counter so that a comparison can be made between the MTAT value and the counter value (e.g. at step 410 discussed below).

At step 405 in FIG. 5, the first IRDC frame from the second device is received by the first device. The first IRDC frame, as is well known in the art, contains a plurality of characters that represent data being sent from the second device to the first device. Upon receiving each character, a counter that is part of an embodiment of the apparatus of the present invention is reset to a reset value (e.g. an asserted low or a zero value) upon receiving each of the plurality of characters.

Thus, as each character is received, the counter is reset to zero ticks (also referred to as a zero count value). When no characters are being received, the counter increments a counter value continuously. Thus, as each microsecond passes, the counter adds clicks to the counter to account for the amount of time passed without receiving any characters.

At step 410, the second IRDC frame is transmitted to the second device when the counter value reaches at least the MTAT value. Thus, at step 410, a comparison is made between the counter value in the counter and the MTAT value in the storage device, e.g. expiry register, and the second IRDC frame is transmitted when the counter value is equal to or exceeds (is at least) the MTAT value. By quantifying the amount of time that had elapsed since the last character was received, the counter is essentially applying that time to the MTAT that has been specified by the second device.

By performing this embodiment of the method of the present invention, many of the limitations of the prior art are overcome. First, there is no error due to the interrupt latency because the counter used to time the MTAT will be reset by the receiver/transmitter at the exact instance the last character of the IRDC frame is received. Therefore, the starting time for the MTAT interval will be correct regardless of how long it takes the processor to service any interrupt which informs it of the presence of received characters.

A second benefit is that the error due to IDLE time is eliminated because the counter used to time the MTAT interval is reset by the UART at the exact instant the last character of the IRDC frame is received. This is true even if the last character is received while the processor is in the midst of an IDLE interrupt.

A third benefit is that there is no error due to any preempted software tasks which implement delay because there is no software task being given the responsibility of insuring that the transmission of the acknowledgement frame is starting when the MTAT has elapsed. Instead, the interrupt occurs at the exact instance the MTAT has elapsed, and (assuming that this particular interrupt is assigned fairly high priority) the interrupt will be serviced, the transmission FIFO will be loaded and the transmission will be initiated at the proper time with little or no error. Also, even when the second mechanism control bit 345 (FIG. 4) is used, the processor 325 (FIG. 4) has loaded the first character of the second IRDC frame into the transmission FIFO in advance of the instance when the MTAT has advanced, and therefore the transmission will automatically be initiated by the receiver/transmitter 300 at the exact right time.

Figure 6:
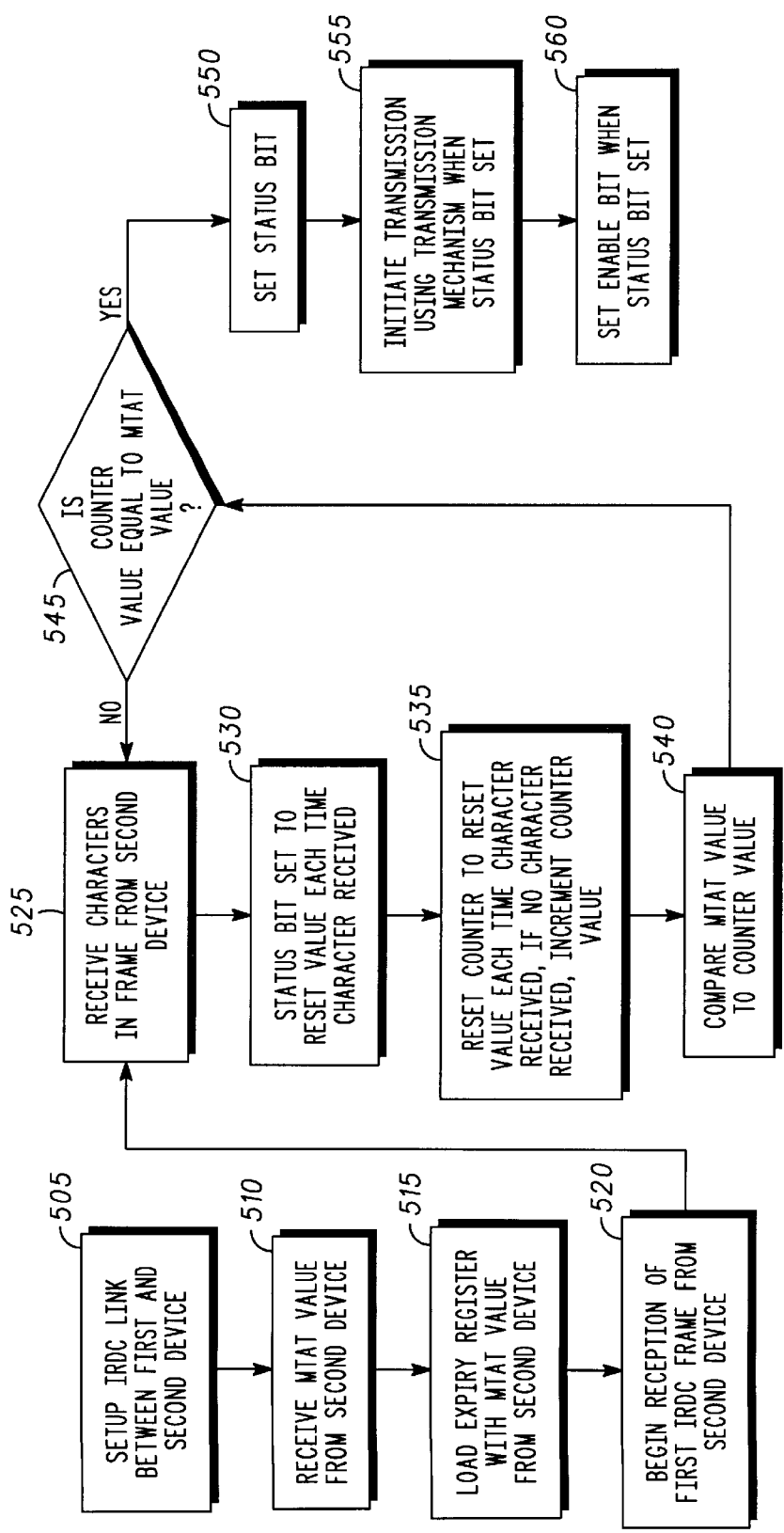
FIG. 6 is a flow chart of another embodiment of the method of the present invention.

FIG. 6 is a flow chart view of a further embodiment of a methodology of the present invention. In FIG. 6, an IRDC link between a first and second device is setup at step 505. Then, as part of the setup transmission, an MTAT value is transferred from the second device to the first device at step 510. It is noted that the methodology of FIG. 6 demonstrates the method for optimizing an MTAT between (a) a reception by a first device of a first IRDC frame sent from a second device and (b) a transmission by the first device of a second IRDC frame to the second device.

After the MTAT value is received from the second device at step 510, that MTAT value is loaded into an expiry register at step 515. The first device begins reception of the first IRDC frame from the second device to receive characters of the first IRDC frame from the second device at steps 520 and 525.

Each time a character is received, a status bit is cleared or reset to a reset value at step 530. In one embodiment, the reset value is zero, however, any reset value may be used that is consistently the opposite of a set value. The status bit is used by the transmission mechanisms of step 555 to know when to initiate transmission of the second IRDC frame.

At step 535, the counter is reset to a reset value each time a character is received. In one embodiment, the reset value is zero. Also at step 535, if no character is received, the counter is incremented so that the counter value is incremented. This step therefore allows the counter to measure the amount of time elapsed since the last character was received in order to compare that time to the MTAT value at step 540.

At step 540, the MTAT value is compared to the counter value, and if the counter value is equal to the MTAT value, or greater than the MTAT value, a status bit is set at step 550. However, if the counter value is less than the MTAT value, then additional characters are received from the second device 525 or the counter continues to increment 535. After the status bit is set at 550, transmission of the second IRDC frame begins to the second device from the first device using a transmission mechanism.

Either of two transmission mechanisms may be used. A first transmission mechanism uses a first mechanism control bit 340 (FIG. 4) which is located in one of the control registers or other similar storage device. The first mechanism control bit is set by a processor to enable an interrupt when the status bit 316 (FIG. 4) is set. The processor will then set a receiver/transmitter interrupt when the counter value reaches the MTAT value. Then the receiver/transmitter interrupt service routine that handles this condition can load the transmission FIFO to start the transmission of the second IRDC frame.

Alternatively, in an alternate embodiment, a second transition mechanism can also be used which utilizes the second mechanism control bit 345 (FIG. 4). Here, the second mechanism control bit, also maintained in a storage device such as the control register of FIG. 4, is set by a processor to prevent a transmission of the second IRDC frame from starting, even if characters are loaded in the receiver/transmitter's transmission FIFO, until the status bit 316 (FIG. 4) is set. With this second transmission mechanism, the processor can load the transmission FIFO with the initial characters to be transmitted in advance of the time when the counter value has reached the MTAT value. At the instant when the counter value reaches the MTAT value, the transmission automatically begins. Then the second mechanism control bit will be automatically reset by the processor whenever transmission of the character ends.

At step 560 of FIG. 6, an enable bit is set when the status bit is set. This step is used for transition T2 (from transmission to reception) as set forth in the flow chart of FIG. 7.

FIG. 7 is a flow chart of a method of optimizing an MTAT. In this embodiment, the method of optimizing a MTAT between (a) a reception by the first device of a first IRDC frame sent from a second device and (b) the transmission by the first device of a second IRDC frame to the second device.

Here, a single step 605 is performed where the enable bit 350 (FIG. 4) disables the receiver/transmitter's receiver while a transmission is in progress (i.e., while there are still characters remaining in the transmission FIFO or transmission shift register). Then, by setting the enable bit 350, the receiver is automatically enabled at the instant a transmission is complete (i.e., at the instant the transmission FIFO and the transmission register are empty) and initializes the receiver at that instant to the "reset" state. By setting this enable bit 350, no action is required by the processor and the transmission is completed to enable or initialize the receiver/transmitter's receiver.

The enable bit has certain advantages over the prior art in that most standard UARTs do not provide a method for disabling the UART's receiver while still allowing the UART to transmit. Further, the receiver is not automatically re-enabled when a transmission finishes in the prior art. Additionally, the "loop back" problem discussed above is alleviated and the MTAT value may be set to a zero value which is the optimal value for T2.

Although the present invention has been described in detail with respect to certain embodiments and examples, variations and modifications exist which are within the scope of the present invention as defined in the following claims. For example, an additional embodiment of the methodology of the present invention includes a modification to the receiving step during the T1 transition. This modification would include setting the counter to the reset value only when a predetermined character is received. The predetermined character may be, for example, a last character or group of characters in the first IRDC frame. The reason for this modification is that, at times, a "stray" character arrives after the first IRDC frame has been received that will reset the counter to a reset value, e.g. zero. The stray character will therefore add more time before the second IRDC frame is sent to the second device since the counter will begin to delay the transmission of the second IRDC frame due to the stray character that reset the counter. To alleviate this concern, an embodiment of the present invention will set the counter to the reset value only when a predetermined character is received. The predetermined character may be a character that is unique to any frame employing IrLAP and that is typically the last character of a frame. For example, for IRDC communications at data rates of 115.2 kbps and below, the very last character of an IRDC frame will always be an end of frame (EOF) character with hexadecimal value $C1. Note further that the IrLAP protocol guarantees that the EOF character will never be present anywhere else in an IrLAP frame. Thus, in an embodiment of the method of the present invention, the first device that is receiving the first IRDC frame would reset the counter only when a predetermined character, e.g. the EOF character, is received. The EOF character may be loaded into a storage device so that the processor can compare the characters of the first IRDC frame with the characters stored in the storage device. If the processor finds a match, thereby finding an EOF character in the first IRDC frame, then transmission of the second IRDC frame may begin. The status bit will then be set as in previous embodiments of this method.

A further embodiment of the present invention includes another modification to the method of T1 of the present invention. This modification relates to the second mechanism control bit 345 (FIG. 4). As previously described, the second mechanism control bit was set to prevent transmission of the second IRDC frame from starting, even if the second IRDC frame characters were loaded into the transmission FIFO, until the counter value has reached the MTAT value (and the status bit was set).

The problem that occurs here is that the processor sets the second mechanism control bit at a point in time at which the processor has finished receiving the first IRDC frame. The second mechanism control bit remains set for a period until the status bit is set and transmission begins. During this period, any characters received by the receiver/transmitter would have to be "stray" characters because it is now known, with certainty, that a complete frame has already been received. To correct for this problem, when using the second mechanism bit, any character reception which occurs after the second mechanism control bit has been set has no effect on the counter. Thus, once this second mechanism bit is set, the counter does not reset. With this modification, "stray" characters received during the window of time from when the processor has finished processing the first IRDC frame until transmission of the second IRDC frame begins, will not affect the device's ability to accurately implement the MTAT from reception to transmission since resetting of the counter used to time the MTAT has now been disabled during this window of time. This modification may also be used with the first mechanism control bit.

In general, the optimization of the MTAT as described herein benefits any application in which throughput must be optimized. More broadly, this invention may be used in any device which performs asynchronous half duplex communications using a standard UART and which requires a very accurate timing from the instance that the reception or a message is complete to the instance that a transmission is started. The present invention has broad applicability to computers, cellular phones, and other such devices infrared transmitting devices.

We claim:

1. A method for optimizing a minimum turn around time (MTAT) between (a) a reception by a first device of a first infrared data communication (IRDC) frame sent from a second device and (b) a transmission by said first device of a second IRDC frame to said second device, comprising:

loading an MTAT value received from said second device into a storage device in communication with said first device;

receiving said first IRDC frame from said second device, said first IRDC frame containing a plurality of characters, each of said plurality of characters setting a counter in communication with said first device to a reset value upon reception of each of said plurality of characters, said counter otherwise incrementing a counter value while none of said plurality of characters are being received; and transmitting said second IRDC frame to said second device when said counter value reaches said MTAT value so that said MTAT is optimized to be at least said MTAT value.

2. The method of claim 1, wherein said loading step further comprises loading said MTAT value into an expiry register.

3. The method of claim 1, wherein said loading step further comprises loading said MTAT value during a setup of said IRDC.

4. The method of claim 1, wherein said step of loading further comprises translating said MTAT value into a format substantially equivalent to a format of the counter value.

5. The method of claim 1, wherein said transmitting step further comprises:

setting a status bit to a set value when said counter value reaches said MTAT value.

6. The method of claim 1, wherein said transmitting step further comprises transmitting said second IRDC frame when said counter value is equal to or greater than said MTAT value.

7. The method of claim 1, wherein said receiving step further comprises setting a status bit to an unset value when each of said plurality of characters is received.

8. The method of claim 1, wherein said transmitting step further comprises:

setting, by a processor of said first device, a first mechanism control bit when said counter value is at least said MTAT value to enable said processor to load said second IRDC frame into said storage device for transmission;

loading said storage device with said second IRDC frame;

transmitting said second IRDC frame; and unsetting said first mechanism control bit after transmitting said second IRDC frame to disable said processor.

9. The method of claim 1, wherein said transmitting step further comprises:

setting, by a processor, a second mechanism control bit to disable said transmission of said second IRDC frame until said counter value is at least said MTAT value, said second mechanism control bit preventing said second IRDC frame from being transmitted;

loading said second IRDC frame into said storage device for transmission when said second mechanism control bit is unset;

unsetting said second mechanism control bit when said counter value is at least said MTAT value; and transmitting said second IRDC frame.

10. The method of claim 1, wherein said receiving step further comprises:

setting said counter to said reset value only when a predetermined character is received, said predetermined character representing a last character of said first IRDC frame.

11. The method of claim 10, wherein said receiving step further comprises:

determining, by a processor, said predetermined character by loading said predetermined character into said storage device;

transmitting said second IRDC frame when any one of said plurality of characters matches said predetermined character in said storage device; and setting a status bit when any one of said plurality of characters matches said predetermined character.

12. The method of claim 1, wherein said transmitting step further comprises:

setting, by a processor, a second mechanism control bit to disable said transmission of said second IRDC frame until said counter value is at least said MTAT value, said second mechanism control bit preventing said second IRDC frame from being transmitted, wherein said receiving of each of said plurality of characters does not set said counter to said reset value;

loading said second IRDC frame into said storage device for transmission when said second mechanism control bit is unset;

unsetting said second mechanism control bit when said counter value is at least said MTAT value; and transmitting said second IRDC frame.

13. A method for optimizing a minimum turn around time (MTAT) between (a) a transmission from a first device of a first infrared data communication (IRDC) frame sent to a second device and (b) a reception by said first device of a second IRDC frame sent from said second device, comprising:

setting an enable bit in a storage device in communication with said first device to:

disable a receiver in communication with said first device while said first device transmits said first IRDC frame; and automatically re-enable said receiver when said transmission is completed so that said MTAT is optimized to a substantially zero value.

14. An apparatus for optimizing infrared data communication (IRDC) via a first device, said apparatus comprising:
a storage device coupled to said first device to store a minimum turn around time (MTAT) value;
a counter coupled to said first device to increment a counter value during a time when said first device does not receive any of a plurality of characters from a second device, said first device to reset said counter value each time said first device receives any of the plurality of characters transmitted by said second device, said plurality of characters comprises at least a portion of a first IRDC frame; and
a status bit within said first device, said first device to set said status bit when said counter value reaches said MTAT to prepare for transmission of a second IRDC frame to said second device.

15. The apparatus as in claim 14 further comprising a transmission mechanism for initiating said second IRDC frame when said status bit is set.

16. The apparatus of claim 15, wherein said storage device comprises an expiry register.

17. The apparatus of claim 15, wherein said transmission mechanism further comprises a processor coupled to said counter to set a first mechanism control bit when said counter value is at least said MTAT value to enable said processor to load said second IRDC frame into said storage device for transmission.

18. The apparatus of claim 15, wherein said transmission mechanism further comprises:
a second mechanism control bit, said second mechanism control bit set by a processor to disable said transmission of said second IRDC frame until said counter value is at least said MTAT value, said second mechanism control bit preventing said second IRDC frame from being transmitted.

19. An apparatus for optimizing a minimum turn around time (MTAT) between (a) a transmission from a first device of a first infrared data communication (IRDC) frame sent to a second device and (b) a reception by said first device of a second IRDC frame sent from said second device, said apparatus comprising:
an enable bit that disables a receiver in communication with said first device while said first device transmits said first IRDC frame and automatically re-enables said receiver after said first IRDC frame has been transmitted to said second device.

20. An apparatus for optimizing infrared data communication (IRDC) via a first device, said apparatus comprising:
a storage device coupled to said first device to store a minimum turn around time (MTAT) value; and
a counter coupled to said first device to increment a counter value during a time when said first device does not receive any of a plurality of characters of a first IRDC data transmitted from a second device, said first device to reset said counter value each time said first device receives any of the plurality of characters transmitted by said second device.

21. The Apparatus as in claim 20 wherein said first device receives said MTAT value from said second device.

22. The apparatus as in claim 21 wherein said first device compares said MTAT value to said counter value to determine if said first device is ready to stop receiving said first IRDC data and commence transmitting second IRDC data.

23. The apparatus as in claim 22 wherein said first device is ready to stop receiving said first IRDC data and commence transmitting said second IRDC data when said counter value substantially equals said MTAT value.

* * * * *